(12) United States Patent
Li et al.

(10) Patent No.: US 10,018,756 B2
(45) Date of Patent: Jul. 10, 2018

(54) DISPLAY APPARATUS AND ELECTRONIC DEVICE

(71) Applicant: Xiaomi Inc., Haidian District, Beijing (CN)

(72) Inventors: Guosheng Li, Beijing (CN); Anyu Liu, Beijing (CN); Wei Sun, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 15/381,055

(22) Filed: Dec. 15, 2016

(65) Prior Publication Data
US 2017/0176653 A1    Jun. 22, 2017

(30) Foreign Application Priority Data
Dec. 16, 2015    (CN) .......................... 2015 1 0945630

(51) Int. Cl.
*G02B 5/04* (2006.01)
*G02B 1/14* (2015.01)

(52) U.S. Cl.
CPC ............... *G02B 5/045* (2013.01); *G02B 1/14* (2015.01)

(58) Field of Classification Search
CPC .. G02B 5/04; G02B 5/045; G02B 1/14; F21V 5/10; F21V 5/00; F21V 8/00; G09F 9/30; G02F 1/13357
USPC ........................................... 359/837; 349/95
See application file for complete search history.

(56) References Cited

U.S. PATENT DOCUMENTS

| | | | |
|---|---|---|---|
| 2004/0090572 A1* | 5/2004 | Han | G02B 5/045 349/95 |
| 2005/0270763 A1 | 12/2005 | Koike et al. | |
| 2008/0198297 A1 | 8/2008 | Choi et al. | |
| 2009/0115970 A1 | 5/2009 | Morejon et al. | |
| 2012/0307522 A1 | 12/2012 | Ham | |

FOREIGN PATENT DOCUMENTS

| | | |
|---|---|---|
| CN | 1704819 A | 12/2005 |
| CN | 101456667 A | 6/2009 |
| CN | 101620325 A | 1/2010 |
| CN | 102520468 A | 6/2012 |
| CN | 202598316 U | 12/2012 |
| CN | 102903836 A | 1/2013 |
| CN | 103939774 A | 7/2014 |

(Continued)

OTHER PUBLICATIONS

International Search Report of PCT/CN2016/101297.
(Continued)

*Primary Examiner* — Euncha Cherry
(74) *Attorney, Agent, or Firm* — Jun He Law Offices P.C.; James J. Zhu

(57) ABSTRACT

A display apparatus and an electronic device are provided, which belong to the field of display technology. The display apparatus comprises a light-converging layer configured to refract the light in a first designated direction, wherein the first designated direction is a direction whose angle with a straight ahead direction of the display apparatus is less than a designated angle, and the straight ahead direction is a direction perpendicular to a plane where the light-converging layer is located; and a light-emitting layer positioned below the light-converging layer and configured to emit light.

18 Claims, 2 Drawing Sheets

(56) References Cited

FOREIGN PATENT DOCUMENTS

| | | |
|---|---|---|
| CN | 204028519 U | 12/2014 |
| CN | 204556876 U | 8/2015 |
| CN | 204577029 U | 8/2015 |
| CN | 105448195 A | 3/2016 |
| JP | 2010256844 | 11/2010 |

OTHER PUBLICATIONS

Extended European search report of European Patent Application No. 16204083.6, from the European Patent office, dated Jul. 7, 2017.
First Office Action issued in corresponding Chinese Application No. 2015109456300 dated4 Sep. 4, 2017.
Second Office Action issued in corresponding Chinese Application No. 201510945630.0 dated Feb. 7, 2018.

* cited by examiner

DISPLAY APPARATUS AND ELECTRONIC DEVICE

CROSS REFERENCE TO RELATED APPLICATIONS

This application is based on and claims priority of the Chinese Patent Application No. 201510945630.0, filed on Dec. 16, 2015, which is incorporated herein by reference in its entirety.

TECHNICAL FIELD

The present disclosure is related to the field of display technology, and more particularly to a display apparatus and an electronic device.

BACKGROUND

In daily life, electronic devices having a display function such as handsets, computers and TVs have been applied in an increasingly broad scope. Usually, a display apparatus is used in such an electronic device to display images. Such a display apparatus typically includes a light-emitting layer and a glass cover plate. The light-emitting layer typically includes an organic light-emitting diode (OLED) layer or a liquid crystal display (LCD) layer, and is positioned above the glass cover plate. When the electronic device needs to display images, the light-emitting layer can emit light. When light travels through the glass cover plate from various directions, reflection or refraction will take place. Reflected light cannot pass through the glass cover plate while refracted light can do so, such that images are displayed based on the refracted light.

SUMMARY

The present disclosure provides a display apparatus and an electronic device.

According to a first aspect of embodiments of the present disclosure, there is provided a display apparatus. The display apparatus includes: a light-converging layer configured to refract the light in a first designated direction, wherein the first designated direction is a direction whose angle with a straight ahead direction of the display apparatus is less than a designated angle, and the straight ahead direction is a direction perpendicular to a plane where the light-converging layer is located; and a light-emitting layer positioned below the light-converging layer and configured to emit light.

According to a second aspect of embodiments of the present disclosure, there is provided an electronic device including a display apparatus, and the display apparatus includes: a light-converging layer configured to refract the light in a first designated direction, wherein the first designated direction is a direction whose angle with a straight ahead direction of the display apparatus is less than a designated angle, and the straight ahead direction is a direction perpendicular to a plane where the light-converging layer is located; and a light-emitting layer positioned below the light-converging layer and configured to emit light.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Figure 1:
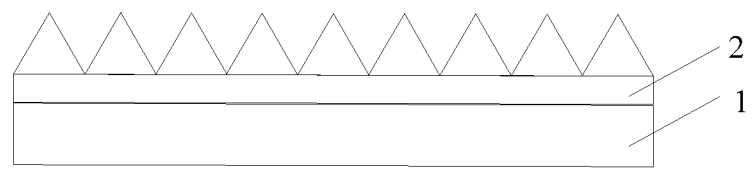
FIG. 1 is a schematic structural diagram showing a display apparatus according to an embodiment.

Reference numerals: 1 light-emitting layer; 2 light-converging layer; 3 glass cover plate; 4 touch control layer; 21 light incident plate; 22 protruding structures; 221 edge of a protruding structure; and 222 two inclined surfaces of a protruding structure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise indicated. The implementations set forth in the following description of embodiments do not represent all implementations consistent with the disclosure. Instead, they are merely examples of apparatuses and methods consistent with aspects related to the disclosure as recited in the appended claims.

FIG. 1 is a schematic structural diagram showing a display apparatus according to an embodiment. As shown in FIG. 1, the display apparatus includes a light-emitting layer 1 and a light-converging layer 2. The light-emitting layer 1 is positioned below the light-converging layer 2 and is configured to emit light. The light-converging layer 2 is configured to refract the light in a first designated direction. The first designated direction is a direction whose angle with a straight ahead direction of the display apparatus is less than a designated angle. The straight ahead direction is a direction perpendicular to a plane where the light-converging layer is located.

The best view field of a user is limited, and when the user uses a device having a display function, usually the user's line of sight is perpendicular to the plane where the display region of the device is located (namely, the plane where the light-converging layer is located). Therefore, the user's line of sight is typically in the straight ahead direction of the device, and the best view field of the user is a range of directions whose angle with the straight ahead direction is less than a designated angle. However, the direction of light emitted from the light-emitting layer 1 is irregular. When the angle between the direction of the light emitted from the light-emitting layer 1 and the straight ahead direction (namely, the direction of the user's line of sight) is greater than the designated angle, the light falls outside the best view field of the user, and the user can hardly see the light. In this case, the light contributes little to the display luminance of the display apparatus. Therefore, by refracting the light in a direction whose angle with the straight ahead direction is greater than the designated angle to travel in a first designated direction, whose angle with the straight ahead direction is less than the designated angle, through the light-converging layer 2 positioned above the light-emitting layer 1, the light-converging layer 2 can converge the light towards the straight ahead direction to increase light within the user's best view field, improve the light utilization rate and increase the display luminance of the display apparatus.

It should be noted that the display luminance of the display apparatus can also be increased by increasing the light-emitting intensity of the light-emitting layer 1, but the power consumption of the display apparatus will increase when increasing the light-emitting intensity of the light-emitting layer 1. In contrast, the embodiments of this disclosure can increase the display luminance of the display apparatus without increasing the light-emitting intensity of the light-emitting layer 1. Therefore, when the display luminance is fixed, requirement on the light-emitting intensity of the light-emitting layer 1 is reduced, and the power consumption of the display apparatus is reduced. When the light-emitting intensity of the light-emitting layer 1 is fixed, the display apparatus can achieve greater display luminance, thereby improving the performance of the display apparatus.

As the angle of the best view field of the user is 60 degrees, when the user's line of sight is in the straight ahead direction, the designated angle is less than 30 degrees. In practical application, the designated angle may be adjusted according to different requirements, which will not be limited to the embodiments of this disclosure.

It should be noted that, to expand the application scope of the light-converging layer, the light-converging layer 2 may be made from transparent material such as polypropylene (PP), polyvinyl chloride (PVC), polyethylene terephthalate (PET), polyethylene (PE), oriented polypropylene (OPP), glass or the like, which will not be limited to the embodiments of this disclosure.

It should also be noted that the light-emitting layer 1 and the light-converging layer 2 may be connected by an optical adhesive or by other means which will not be limited in the embodiments of this disclosure, so long as the light-emitting layer 1 is positioned below the light-converging layer 2 and the light emitted from the light-emitting layer 1 can pass through the light-converging layer 2.

Figure 2:
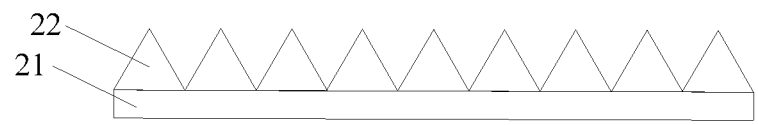
FIG. 2 is a schematic structural diagram showing a light-converging layer according to an embodiment.

Referring to FIG. 2, the light-converging layer 2 includes a light incident plate 21 and a plurality of protruding structures 22, the plurality of protruding structures 22 being arranged on a side of the light incident plate 21 away from the light-emitting layer 1.

It should be noted that light will not change its direction when passing through the light incident plate 21, but will be refracted in the first designated direction when it passes through the plurality of protruding structures 22. As such, intensity of light in the straight ahead direction is increased and the light utilization rate is increased.

It should also be noted that the bottom of the plurality of protruding structures 22 may be laid on and cover a side of the light incident plate 21 away from the light-emitting layer 1, so that all light passing through the light-converging layer 2 will be refracted, thereby improving the display luminance of the display apparatus. The number of the protruding structures 22 will not be limited in the embodiments of this disclosure.

It should also be noted that the protruding structures 22 may be the same or different from one another, which will not be limited in the embodiments of this disclosure.

Figure 3:
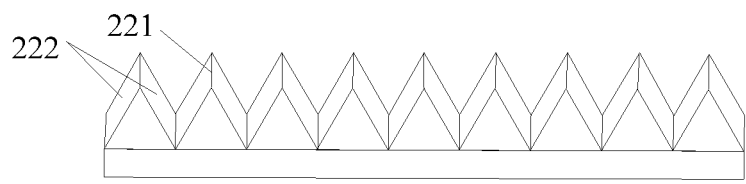
FIG. 3 is a schematic structural diagram showing another light-converging layer according to an embodiment.

Referring to FIG. 3, a side surface of any of the plurality of protruding structures 22 is a triangle and extends along a second designated direction.

The second designated direction may be parallel to the light incident plate 21, which will not be limited in the embodiments of this disclosure.

It should be noted that, referring to FIG. 3, when a side surface of any of the plurality of the protruding structures is a triangle and extends along a second designated direction, a vertex of the triangle may extend along the second designated direction to form an edge 221 of the protruding structure, and two legs of the triangle may extend along the second designated direction respectively to form two inclined surfaces 222 of the protruding structure. As the refractive index of the air is less than that of the light-converging layer 2, when light passes through the inclined surfaces 222, an angle a between the refracted light and each inclined surface 222 is less than an angle b between the incident light and the inclined surface 222 as shown in FIG. 4, that is, the light is refracted in a first designated direction to increase light in the best view field of the user, the light utilization rate and the display luminance.

Further, the triangle may be an isosceles triangle. Of course, this triangle may also be a special triangle (such as a regular triangle or a right triangle) or a non-special triangle of any shape.

It should be noted that, when the triangle is an isosceles triangle, the two inclined surfaces 222 are symmetric relative to a plane of the first designated direction where the edge 221 is located. When the protruding structure refracts light in the first designated direction, the light can be symmetric relative to the plane. As such, when the light-converging layer 2 refracts the light in the first designated direction, the light is distributed more uniformly, and the light refracting effect and the light utilization rate are improved.

Figure 4:
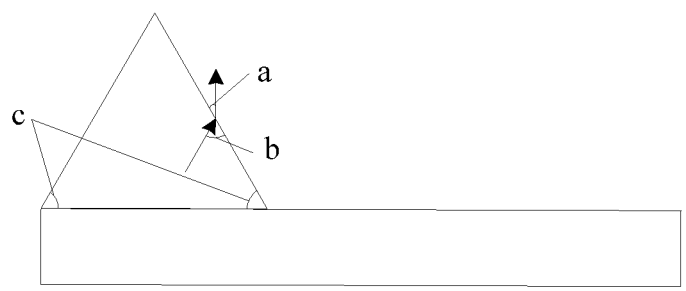
FIG. 4 is a schematic conceptual diagram showing how a protruding structure refracts light according to an embodiment.

Further, referring to FIG. 4, each of two base angles c of the triangle is less than 90 degrees. Of course, in practical application, the two base angles c of the triangle may also be adjusted according to actual demands.

The two base angles c of the triangle may be identical or different. Because the sum of three interior angles of the triangle is fixed, the shape of the triangle may be changed by adjusting the two base angles c of the triangle, thereby changing the shape of the protruding structure 22 and adjusting the refracting effect of the light-converging layer 2 on light.

It should be noted that, the two base angles c of the triangle are less than 90 degrees respectively, so as to ensure that the two legs of the triangle may extend along the second designated direction respectively to form two inclined surfaces 222 of the protruding structure when the triangle extends along the second designated direction. As such, the light-converging layer 2 can refract light in the first designated direction.

Figure 5:
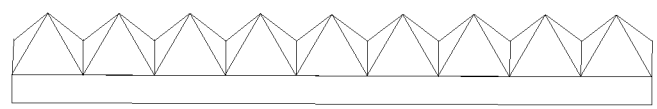
FIG. 5 is a schematic structural diagram showing yet another light-converging layer according to an embodiment.

In addition, referring to FIG. 5, any one of the plurality of protruding structures 22 is a pyramid structure.

When the protruding structure is a pyramid structure, the pyramid structure refracts light in the first designated direction. Because the light-emitting layer 1 generally includes a plurality of pixels, the protruding structure may correspond to one or more pixels in the light-emitting layer 1 and accordingly refract light emitted from the one or more pixels in the light-emitting layer, thereby improving the light refracting effect and the light utilization rate.

Further, the pyramid structure may be a regular pyramid. Of course, the pyramid structure may also be a pyramid of any other structure.

It should be noted that, when the pyramid structure is a regular pyramid, the vertex of the pyramid structure is in an axis of the pyramid structure. The pyramid structure refracts light in the first designated direction, and the light can be line-symmetric relative to the first designated direction where the vertex of the pyramid is located, thereby further improving the light reflecting effect and the light utilization rate.

Figure 6:
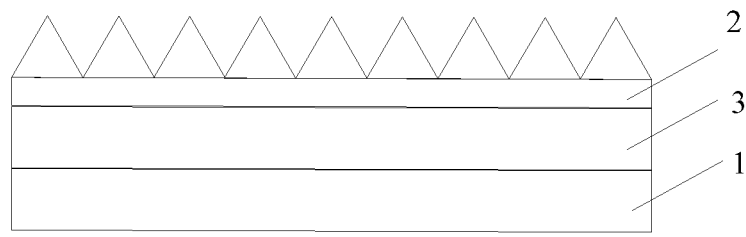
FIG. 6 is a schematic structural diagram showing another display apparatus according to an embodiment.

Referring to FIG. 6, the display apparatus further includes a glass cover plate 3 positioned between the light-emitting layer 1 and the light-converging layer 2.

When the light-emitting layer 1 needs support and protection and the light-converging layer 2 is made from a material having lower hardness such as PP, PVC, PET, PE, OPP or the like, the light-converging layer 2 can only provide limited support and protection. Therefore, the display apparatus further includes the glass cover plate 3, which can provide support and protection for the light-emitting layer 1. When the light-converging layer 2 is made from a material having higher hardness such as glass, the light-converging layer 2 can provide sufficient support and protection for the light-emitting layer 1, and the display apparatus may not include the glass cover plate 3.

It should be noted that, as the glass cover plate 3 is positioned between the light-emitting layer 1 and the light-converging layer 2, the light emitted from the light-emitting layer 1 passes through the light-converging layer 2 after passing through the glass cover plate 3, thereby preventing reflection and refraction from occurring when the light passes through the light-converging layer 2, improving the light refraction effect of the light-converging layer 2 and facilitating replacement of the light-converging layer 2 when it is worn.

Figure 7:
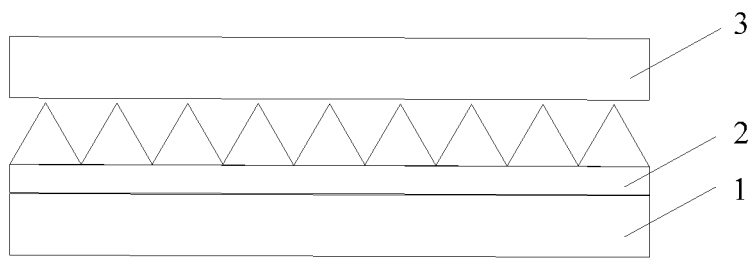
FIG. 7 is a schematic structural diagram showing yet another display apparatus according to an embodiment.

In addition, referring to FIG. 7, the display apparatus further includes a glass cover plate 3 positioned above the light-converging layer 2.

It should be noted that, when the glass cover plate 3 is positioned above the light-converging layer 2, the glass cover plate 3 can protect the light-converging layer 2, and prevent the plurality of protruding structures 1022 in the light-converging layer 2 from abrasion, thereby prolonging the service life of the light-converging layer.

It should be noted that, in practical application, the display apparatus may also include one or more other structures, such as a touch control layer and a light filtering layer, which will not be limited in the embodiments of this disclosure. If the display apparatus includes other structures, such structures may be positioned between the light-emitting layer 1 and the light-converging layer 2, or below the light-emitting layer 1, or above the light-converging layer 2, according to practical needs. The positions of such structures will not be limited in the embodiments of this disclosure.

Figure 8:
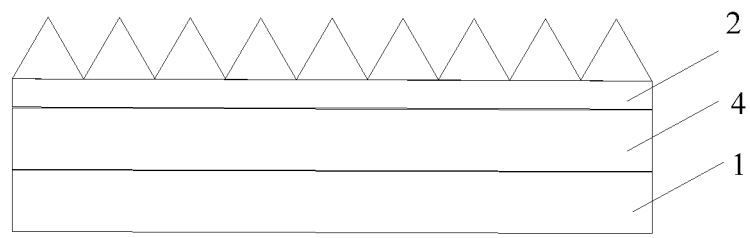
FIG. 8 is a schematic structural diagram showing a display apparatus according to another embodiment.
Figure 9:
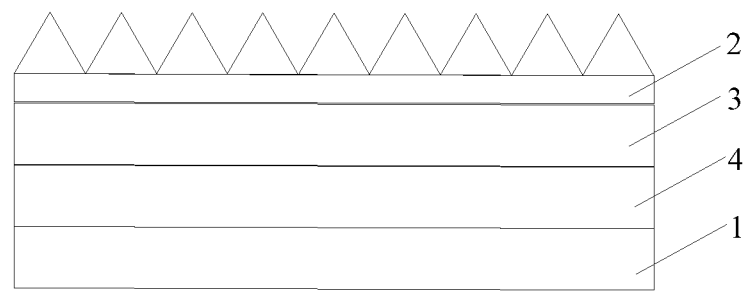
FIG. 9 is a schematic structural diagram showing a display apparatus according to yet another embodiment.

For example, when the display apparatus includes a touch control layer 4, the touch control layer 4 may be positioned between the light-emitting layer 1 and the light-converging layer 2, as shown in FIG. 8. When the display apparatus includes a glass cover plate 3 and a touch control layer 4, the glass cover plate 3 and the touch control layer 4 may be positioned between the light-emitting layer 1 and the light-converging layer 2, and the touch control layer 4 may be positioned below the glass cover plate 3, as shown in FIG. 9.

In the embodiments of this disclosure, the light-emitting layer of the display apparatus is positioned below the light-converging layer; and when light emitted from the light-emitting layer passes through the light-converging layer, the light-converging layer refracts the light in a first designated direction through the plurality of protruding structures. As a result, light in the best view field of a user is increased, and the light utilization rate is increased, so that the display luminance of the display apparatus is increased without increasing the light-emitting intensity of the light-emitting layer, thereby reducing the power consumption thereof and saving energy. In addition, the display apparatus may also include a glass cover plate, a touch control layer and other structures according to practical needs. If the display apparatus includes other structures, the position of the light-converging layer may be changed according to different application scenarios, thereby extending the application scope of the light-converging layer and the display apparatus.

According to an exemplary embodiment, there is also provided an electronic device comprising the display apparatus according to any of the above embodiments.

In the embodiment of this disclosure, the electronic device includes the display apparatus; the light-emitting layer of the display apparatus is positioned below the light-converging layer; and when light emitted from the light-emitting layer passes through the light-converging layer, the light-converging layer refracts the light in a first designated direction through the plurality of protruding structures. As a result, light in the best view field of a user is increased, and the light utilization rate is increased, so that the display luminance of the display apparatus is increased without increasing the light-emitting intensity of the light-emitting layer, thereby reducing the power consumption thereof and saving energy.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A display apparatus, comprising:
    a light-converging layer configured to refract an incident light travelling in a direction whose angle with a straight ahead direction of the display apparatus is greater than a designated angle to travel in a first designated direction, wherein the first designated direction is a direction whose angle with the straight ahead direction of the display apparatus is less than the designated angle, and the straight ahead direction is a direction perpendicular to a plane where the light-converging layer is located; and a light-emitting layer positioned below the light-converging layer and configured to emit the light;
wherein the light-converging layer comprises:
   a light incident plate; and
   a plurality of protruding structures arranged on a side of the light incident plate away from the light-emitting layer;
wherein the light-converging layer is directly connected to the light-emitting layer.

2. The apparatus of claim 1, wherein a side surface of any of the plurality of protruding structures is a triangle and extends along a second designated direction.

3. The apparatus of claim 2, wherein the triangle is an isosceles triangle.

4. The apparatus of claim 2, wherein each base angle of the triangle is less than 90 degrees.

5. The apparatus of claim 2, wherein the second designated direction is a direction parallel to the light incident plate.

6. The apparatus of claim 1, wherein any of the plurality of protruding structures is a pyramid structure.

7. The apparatus of claim 1, wherein the designated angle is less than 30 degrees.

8. The apparatus of claim 1, further comprising a glass cover plate positioned between the light-emitting layer and the light-converging layer.

9. The apparatus of claim 1, further comprising a glass cover plate positioned above the light-converging layer.

10. An electronic device comprising a display apparatus, the display apparatus comprising:
   a light-converging layer configured to refract an incident light travelling in a direction whose angle with a straight ahead direction of the display apparatus is greater than a designated angle to travel in a first designated direction, wherein the first designated direction is a direction whose angle with the straight ahead direction of the display apparatus is less than the designated angle, and the straight ahead direction is a direction perpendicular to a plane where the light-converging layer is located; and
   a light-emitting layer positioned below the light-converging layer and configured to emit the light;
wherein the light-converging layer comprises:
   a light incident plate; and
   a plurality of protruding structures arranged on a side of the light incident plate away from the light-emitting layer;
wherein the light-converging layer is directly connected to the light-emitting layer.

11. The electronic device according to claim 10, wherein a side surface of any of the plurality of protruding structures is a triangle and extends along a second designated direction.

12. The electronic device according to claim 11, wherein the triangle is an isosceles triangle.

13. The electronic device according to claim 11, wherein each base angle of the triangle is less than 90 degrees.

14. The electronic device according to claim 11, wherein the second designated direction is a direction parallel to the light incident plate.

15. The electronic device according to claim 10, wherein any of the plurality of protruding structures is a pyramid structure.

16. The electronic device according to claim 10, wherein the designated angle is less than 30 degrees.

17. The electronic device according to claim 10, further comprising a glass cover plate positioned between the light-emitting layer and the light-converging layer.

18. The electronic device according to claim 10, further comprising a glass cover plate positioned above the light-converging layer.

* * * * *